United States Patent [19]

Mayer et al.

[11] Patent Number: 4,529,795
[45] Date of Patent: Jul. 16, 1985

[54] PROCESS FOR RECOVERING AND PURIFYING UNREACTED PROPYLENE DURING MASS POLYMERIZATION OF LIQUID PROPYLENE

[75] Inventors: Gunter Mayer, Königstein; Eberhard Fischer, Kelkheim; Helmut Strametz, Frankfurt am Main, all of Fed. Rep. of Germany

[73] Assignee: Hoechst Aktiengesellschaft, Frankfurt am Main, Fed. Rep. of Germany

[21] Appl. No.: 210,220

[22] Filed: Nov. 25, 1980

Related U.S. Application Data

[63] Continuation of Ser. No. 48,011, Jun. 13, 1979, abandoned.

[30] Foreign Application Priority Data

Jun. 15, 1978 [DE] Fed. Rep. of Germany ....... 2826196

[51] Int. Cl.³ ............................. C08F 6/10; C08F 6/28
[52] U.S. Cl. .................................... 528/501; 528/481; 528/503
[58] Field of Search ......................................... 528/501

[56] References Cited

U.S. PATENT DOCUMENTS

| 3,719,643 | 3/1973 | Knight | 528/501 |
| 3,816,379 | 6/1974 | Rosenbaum | 528/501 |
| 4,093,795 | 6/1978 | Buechner | 528/481 |

FOREIGN PATENT DOCUMENTS

| 1389697 | 1/1965 | France | 528/501 |
| 826284 | 12/1959 | United Kingdom | 528/501 |
| 1000551 | 8/1965 | United Kingdom | 528/501 |
| 1040669 | 9/1966 | United Kingdom | 528/501 |

Primary Examiner—Christopher A. Henderson
Attorney, Agent, or Firm—Curtis, Morris & Safford

[57] ABSTRACT

During the recovery of the unreacted propylene from the mother liquor obtained in the polymerization of liquid propylene, the major part of the propylene is evaporated in a first evaporation step at a low temperature and the remaining part is evaporated in a second evaporator at a high temperature. In this way an early agglomerization of the atactic and/or low-molecular weight polymer dissolved in the mother liquor and fouling of the heat exchanger tubes and/or of the column trays is avoided.

5 Claims, 1 Drawing Figure

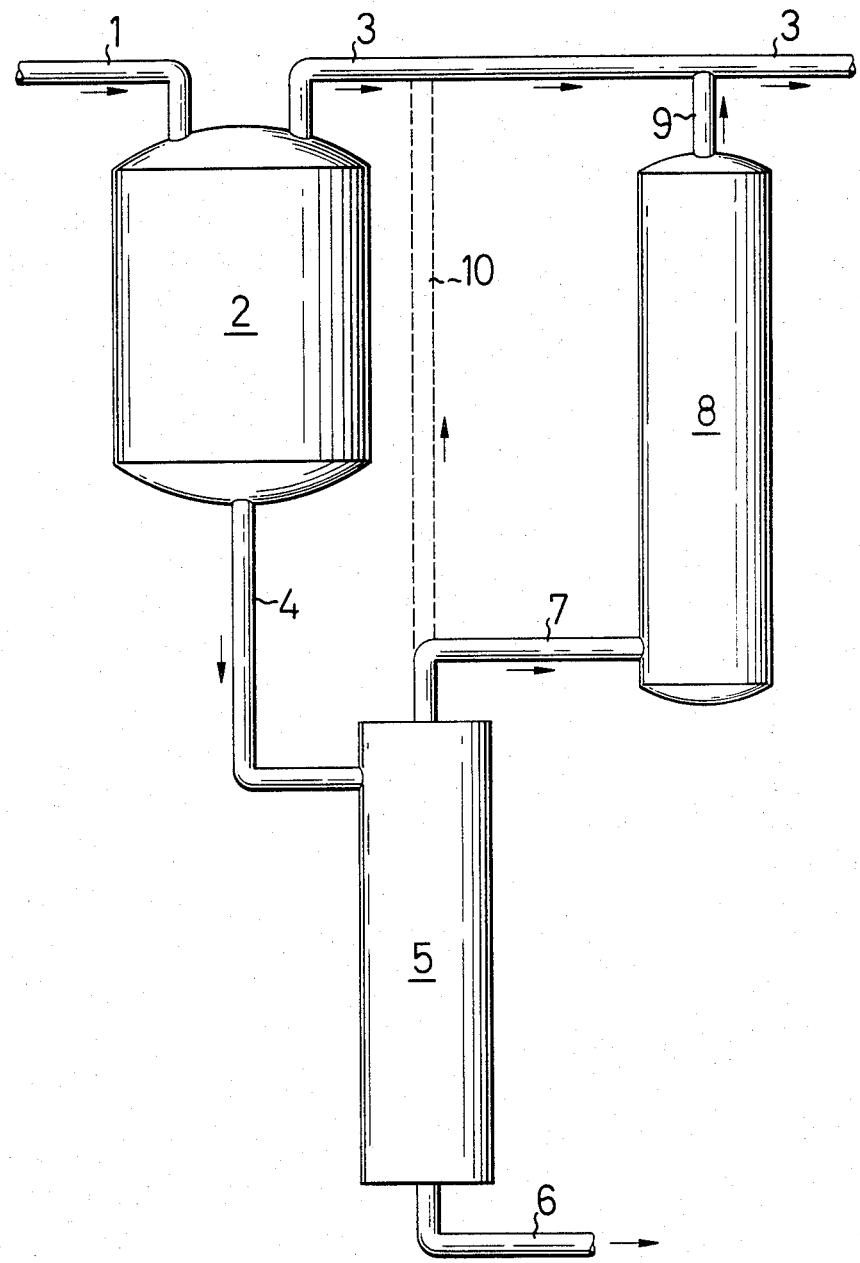

PROCESS FOR RECOVERING AND PURIFYING UNREACTED PROPYLENE DURING MASS POLYMERIZATION OF LIQUID PROPYLENE

This is a continuation of application Ser. No. 048,011 filed June 13, 1979, now abandoned.

BACKGROUND OF THE INVENTION

The present invention relates to a process for the purification and recovery of propylene obtained from suspension polymerization plants for the manufacture of polypropylene, the suspension medium consisting mainly of propylene (the so-called mass polymerization).

The present invention moreover relates to the removal of atactic polypropylene formed during the polymerization, isotactic fines, catalyst residuals and additional suspension medium from the plant.

The polymerization of propylene in the liquid monomer, optionally in the presence of comonomers such as ethylene and higher α-olefins, is known. The reaction is carried out either in vessels provided with an agitator or in loop reactors. After completion of the polymerization a mixture containing solid polypropylene suspended in the excess liquid propylene and catalyst residuals is obtained. The liquid propylene further contains amorphous polypropylene and optionally low-molecular weight isotactic polypropylene in a dissolved state. A number of processes are known for working up this mixture.

For example, the suspension may be subjected to a flash evaporation for separating the monomer and the polymer, however, this process involves an absorption of the above-specified dissolved constituents on the product and a quality diminution of the latter. Furthermore, the vapors must be compressed again prior to being condensed in an economic manner (cf. British Pat. No. 10 40 669).

These disadvantages may be avoided by using a pressure decanter or a washing column, these processes yielding a powder with a relatively low content of atactic polymer and catalyst residual which is subjected to the further working up and drying.

The monomer obtained during the separation step must be worked up to remove the dissolved constituents prior to being recycled to the process.

It is further known to evaporate the propylene in a rectifying column at 40° to 55° C. (cf. German Offenlegungsschrift No. 15 20 569) or in a flash evaporator at 40° to 70° C. (cf. Japanese Patent Publication No. 52 005 881). However, agglomeration of the polymer, fouling of the heat exchanger tubes and of the column trays must be taken into consideration under these temperature conditions. Fouling likewise occurs in heat exchangers heated with high pressure steam.

A still further process is carried out above the critical point of propylene. In this case the atactic polypropylene is discharged in a liquid state after the phase separation. However, an unsatisfactory factor in this process is that the high reaction heat of the polymerization cannot be utilized, since it ranges at a low temperature level (cf. Japanese Patent Publication No. 75 020 046).

SUMMARY OF THE INVENTION

It has now been found that the disadvantages of the above processes can be avoided when evaporating the polypropylene at temperatures that are so low that the atactic polymer does not show a tendency to swell and to agglomerate or to become sticky, but precipitates as fine floccules, although its solubility limit has been exceeded.

In accordance with the present invention, a process is provided for recovering the unreacted propylene from the mother liquor obtained in the polymerization of propylene or either a mixture of propylene and ethylene or a 1-olefin of the formula $CH_2=CHR$ with R being alkyl having from 2 to 10 carbon atoms or both, in liquid propylene as suspension medium, upon separation of the solid polymer formed and containing mainly liquid propylene and atactic polymer, which comprises evaporating 50 to 95 weight % of the propylene in a first evaporator at a temperature of from 0° to 35° C. and subsequently evaporating the residual propylene in a second evaporator with forced conveyance at a temperature of from 150° to 300° C.

DETAILED DESCRIPTION

For carrying out the process of the invention propylene or mixtures of propylene and either ethylene or higher 1-olefins of the formula $CH_2=CHR$ with R being alkyl having from 2 to 10 carbon atoms or both, are polymerized in known manner in a vessel provided with a stirrer or in loop reactors. Depending on the catalyst system, the temperatures are in the range of from 60° to 75° C. and the dwelling times vary from 2 to 6 hours. Hydrogen is used as a molecular weight regulator if required.

For carrying out the polymerization, the known highly stereospecific catalyst systems such as a combination of a $TiCl_3$-containing component prepared by reduction of $TiCl_4$ with aluminum or alumino-organic compounds of the formula $AlR_n^1X_{3-n}$ with $R^1$ being alkyl having from 2 to 16 carbon atoms, X being halogen and $1 \leq n \leq 3$ and subsequently subjected to a thermal aftertreatment with an alumino-organic compound of the formula $AlR_m^1X_{3-m}$ as activator with $R^1$ being likewise alkyl having from 2 to 16 carbon atoms, with $1 \leq m \leq 3$, and X being halogen can be used. Alternatively, a $TiCl_3$ component aftertreated with complexing compounds may be used or the stereospecificy of the catalyst system may be improved by the addition of so-called tertiary components to the polymerization batch or both steps may be combined.

Alternatively a $TiCl_3$ component different from the above types may be used, if it yields highly stereospecific catalyst systems in combination with one of the above-specific activators, these catalyst systems being, for example commercial catalyst components of the composition $TiCl_3 \cdot \frac{1}{3} AlCl_3$ alone or in combination with a complexing agent for improving the stereospecificy.

Suitable complexing agents include ethers, thioethers, thiols, phosphines, amines, amides, ketones or esters. Suitable tertiary components are, by way of example, cyclopolyenes and phosphorus-containing compounds.

Finally there may be used a catalyst system that contains as the solid component magnesium chloride, optionally electron donors and a compound of the tri- or tetravalent titanium and which is combined with an activator. Suitable electron donors are, by way of example, oxygen- or nitrogen-containing organic compounds such as esters or amines. Examples of suitable activators are preferably alumino-organic compounds.

Polymerization gives a suspension that contains from 20 to 60 weight % of pulverulent crystalline polypropylene, from 0.5 to 10% dissolved atactic polymer, catalyst residuals and unreacted propylene. Optionally an inert diluent may be present as well. The solid polypropylene is separated from the suspension by sedimentation, filtration or centrifugation and may optionally be washed thereafter with liquid propylene or with the aforesaid dispersion agent.

The mixture containing the dissolved polypropylene and the washing liquids is fed to the first stage of a multiple-stage propylene recovery plant.

The invention will be illustrated, by way of example only, in the accompanying drawing representing a flow scheme and in the following examples. The aforesaid solutions flow through conduit 1 to the evaporator 2. The evaporator preferably is a circulation evaporator preferably heated by the cooling medium of the polymerization reactor and, thus, utilizing the heat of polymerization. From 50 to 95, preferably from 80 to 90, weight % of the propylene contained in the mixture, which flows through conduit 3 to the condenser, is evaporated in the evaporator at a temperature of from 0° to +35° C., preferably of from 20° to 30° C. under a pressure of from 6 to 15 bars.

The thickened mixture still containing propylene, polypropylene in dissolved and/or dispersed form, catalyst residuals and optionally an inert dispersion agent passes through conduit 4 to a further evaporator 5, where the residual propylene is separated. This evaporator is distinguished by a forced conveyance system, for example as provided by a thin layer evaporator. The mixture may be concentrated in one or in several steps. The plant may be operated with parallel flow or counter-current flow at a temperature from 150° to 300° C. under a pressure from 1 to 15 bars. In this process the atactic polypropylene is obtained in a liquid form. It is discharged from the plant through conduit 6. The evaporated propylene flows through conduit 7 to purification device 8, which may be a distillation column or an absorption tower and passes thereafter through conduit 9 to the condenser.

In case that the propylene should leave the evaporator 5 in a sufficiently pure state, it may be conveyed directly through conduit 10 to the condenser.

The advantages of the process of the invention reside in the fact that no agglomeration of the atactic and/or low-molecular weight polymer and, hence, no fouling of the tubes of the heat exchanger and/or no stickiness of the column trays occurs. A further advantage is that the reaction heat of the polymerization can be utilized for the evaporation of the propylene, which represents a considerable economy of energy. Finally the process of the invention has the advantage that, owing to the low boiling temperature, high-boiling catalyst residuals, further high-boiling auxiliaries such as stereoregulators and isotactic fine polypropylene powder that has not been separated, are precipitated quantitatively in the bottom of the evaporator. Hence, an additional purification of the propylene evaporated in the evaporator, for example by absorption or distillation, may be dispensed with in many cases.

EXAMPLE

1. Manufacture of the catalyst

The catalyst component may for example, be prepared in the following way:

1090 ml of a hydrogenated, oxygen-free gasoline fraction (boiling point of from 140° to 165° C.) and 550 ml titanium tetrachloride (5 mols) are placed into a 10 liter vessel equipped with an agitator, with the exclusion of air and humidity and at 0° C., a solution of 1111.2 g aluminum sesquichloride (containing 4.5 mols aluminum diethyl monochloride) in 334 g of the gasoline fraction is added thereto dropwise while stirring (250 r.p.m.) under nitrogen, within 8 hours whereupon a reddish-brown fine precipitate forms. Stirring is continued for 2 hours at 0° C. and for 12 hours at room temperature.

The resulting suspension is heated for 4 hours to 90° C. and a further 6 hours to 110° C. The precipitate formed is successively separated from the supernatant mother liquor by decantation and washed five times with 2,000 ml of the gasoline fraction each time. The washed solid product is again suspended in the gasoline fraction and the suspension is adjusted to a concentration of 2 mols $TiCl_3$/liter. The content of trivalent titanium of the suspension is determined by titration with a Ce(IV) solution.

Next, the suspension is heated while stirring to 80° C. and then 0.95 mol di-n-butyl ether per mol $TiCl_3$ is added dropwise thereto within 30 minutes. During this addition the mother liquor gets an olive-green shade. Then successively the suspension is kept at 80° C. for one hour, and the solid $TiCl_3$-containing reaction product is washed five times with each time 500 ml of the gasoline fraction per mol $TiCl_3$.

The washed solid reaction product is again suspended in the gasoline fraction and the suspension is diluted to a concentration of 0.01 mol $TiCl_3$/liter in an agitator vessel that has a greater size than the first vessel mentioned. Thereafter 0.02 mol aluminum diethyl monochloride and 0.005 mol cycloheptatriene-(1,3,5) per liter of catalyst suspension are added and the suspension is stirred for one hour at room temperature.

2. Polymerization

To a tube reactor of 360 liter volume there are fed by pumping per hour 60 kg propylene, 0.3 mol aluminum diethyl monochloride and 3 liters of the previously prepared catalyst component mixture having the above-specified composition, which corresponds to 0.03 mol $TiCl_3$, 0.06 mol aluminum diethyl monochloride and 0.015 mol cycloheptatriene-(1,3,5) and furthermore 20 liters of hydrogen (measured under normal conditions of pressure and temperature).

After a dwelling time of 3 hours at 68° C. under a pressure in the reactor of 35 bars 20 kg/h of polypropylene powder and 40 kg/h or propylene mother liquor are withdrawn from the reactor. Then the suspension is passed to a receiving vessel, where its pressure is released to 12 bars and where its phases are separated by sedimentation.

The separated and dried powder has a MFI value 230/5 of 3.5 g/10 minutes. The mother liquor, which contains 2% of atactic polypropylene, flows from the sedimentation vessel to a circulation evaporator (represented in the figure by the numeral 2) which has an evaporation surface of 1 m² and is operated at 25° C., under 12 bars using the cooling medium of the reactor as heating agent.

Upon evaporation of about 80% of the propylene about 5 kg/h of a suspension containing 12% of atactic polypropylene are pumped into a thin layer evaporator having a surface of 0.25 m² which is operated at an external temperature of 240° C. (represented in the figure by the numeral 5). 0.6 kg of atactic polypropylene in a liquid form are withdrawn as bottom product by means of a gear pump.

The circulation evaporator works in continuous manner and shows no deposits.

COMPARATIVE EXAMPLE

The catalyst manufacture and the polymerization are carried out in analogous manner to Example 1, however, the sedimentation vessel and the circulation evaporator are operated at a temperature of 60° C.

When again withdrawing the suspension from the circulation evaporator by pumping at a rate of 5 kg/h, it contains 12% of atactic polypropylene which tends to swell and to agglomerate.

After an operation time of 6 days, the tubes of the heat exchanger have fouled and have to be purified.

What is claimed is:

1. In an evaporation process for recovering purified propylene from a mother liquor containing mainly propylene, atactic polymer and dissolved low molecular weight isotactic polypropylene said mother liquor being obtained by removing any solid polymer formed in the polymerization of propylene or a mixture of propylene and either or both of ethylene or a 1-olefine of the formula $CH_2=CHR$ wherein R is an alkyl group having from 2-10 carbon atoms in the presence of a stereospecific catalyst, the improvement which comprises performing the evaporation in two stages, said first stage being conducted at a temperature of from 0° to 35° C. to recover a first overhead product of substantially pure propylene wherein 50%-95% by weight of the propylene present in said mother liquor is removed therefrom followed by a second evaporation stage being conducted at a temperature of from 150° C.–300° C. wherein any residual propylene remaining in said mother liquor is removed to form a second overhead product of substantially pure propylene.

2. The process according to claim 1 wherein 80 to 90 weight percent of propylene present in said mother liquor is evaporated in said first evaporation step.

3. The process according to claim 1 wherein the first evaporation step is conducted at a temperature in the range of 20° to 30° C.

4. The process according to claim 1 wherein the first evaporation step is performed in a circulation evaporator.

5. The process according to claim 1 wherein heat derived in the polymerization is applied as heating medium in the circulation evaporator.

* * * * *